United States Patent
Ogawa et al.

(10) Patent No.: US 12,215,742 B2
(45) Date of Patent: Feb. 4, 2025

(54) SLIDING MEMBER

(71) Applicant: DAIDO METAL COMPANY LTD., Nagoya (JP)

(72) Inventors: Tetsuya Ogawa, Inuyama (JP); Erina Yasuda, Inuyama (JP); Kenji Nimura, Inuyama (JP)

(73) Assignee: DAIDO METAL COMPANY LTD., Aichi (JP)

( * ) Notice: Subject to any disclaimer, the term of this patent is extended or adjusted under 35 U.S.C. 154(b) by 85 days.

(21) Appl. No.: 17/774,069

(22) PCT Filed: Nov. 27, 2020

(86) PCT No.: PCT/JP2020/044260
§ 371 (c)(1),
(2) Date: May 3, 2022

(87) PCT Pub. No.: WO2021/112008
PCT Pub. Date: Jun. 10, 2021

(65) Prior Publication Data
US 2022/0381292 A1    Dec. 1, 2022

(30) Foreign Application Priority Data
Dec. 3, 2019 (JP) .................................. 2019-218760

(51) Int. Cl.
*F16C 33/20* (2006.01)
(52) U.S. Cl.
CPC .................................. *F16C 33/201* (2013.01)
(58) Field of Classification Search
CPC ............... F16C 33/201; F16C 33/6696; F16C 2240/30; F16C 9/02; F16C 9/04; F16C 33/20; C08K 3/01; C08L 101/00
See application file for complete search history.

(56) References Cited

U.S. PATENT DOCUMENTS

| | | | |
|---|---|---|---|
| 2007/0230846 A1* | 10/2007 | Tanaka | B32B 27/00 384/276 |
| 2018/0087574 A1* | 3/2018 | Yamauchi | F16C 33/1095 |

FOREIGN PATENT DOCUMENTS

| | | | |
|---|---|---|---|
| JP | 2008095725 A | | 4/2008 |
| JP | 2017115920 A | * | 6/2017 |

(Continued)

OTHER PUBLICATIONS

International Search Report dated Mar. 2, 2021, for International Patent Application No. PCT/JP2020/044260.

(Continued)

*Primary Examiner* — Taiwo Oladapo
(74) *Attorney, Agent, or Firm* — KARCESKI IP LAW, PLLC

(57) ABSTRACT

A sliding member includes a resin overlay layer on a sliding-surface side of a bearing alloy layer. The resin layer includes a resin binder and 20% by volume or more of solid lubricant particles with an anisotropic shape dispersed in the resin binder. The sliding surface is located at 0° and has a virtual axis perpendicular to the sliding surface at 90°. An angle θ is formed by a straight line and a major axis of the particles. The total number of the particles in a observation region is N. A rate R1=N1/N of the number N1 of first particles at the angle θ of 70°≤θ≤90° from among the particles is 3%≤R1≤20%, and a rate R2=N2/N of the number N2 of second particles with the angle θ being θ≤20° is 35%≤R2≤65%.

6 Claims, 10 Drawing Sheets

(56) References Cited

FOREIGN PATENT DOCUMENTS

| JP | 2018071581 A | 5/2018 |
|---|---|---|
| JP | 2018146060 A | 9/2018 |

OTHER PUBLICATIONS

Korean Office Action dated Feb. 19, 2024, for Korean Patent Application No. 10-2022-7016415.

* cited by examiner

Fig.6

| ROTATION FREQUENCY | 500 rpm |
|---|---|
| TEST SURFACE PRESSURE | 4MPa |
| TEST TIME | 8 HOURS |
| LUBRICANT OIL | VG22 |
| AMOUNT OF LUBRICANT OIL | 2.0ml/min |
| TEMPERATURE OF LUBRICANT OIL | 80°C |
| AXIS MATERIAL | S55C |

Fig.7

|  | R1 | R2 | AMOUNT OF ABRASION | FRICTION COEFFICIENT |
| --- | --- | --- | --- | --- |
|  | % | % | $\mu$m |  |
| EXAMPLE 1 | 3.9 | 56.6 | 4.4 | 0.020 |
| EXAMPLE 2 | 6.0 | 60.8 | 3.9 | 0.018 |
| EXAMPLE 3 | 9.4 | 39.4 | 3.8 | 0.020 |
| EXAMPLE 4 | 12.3 | 48.3 | 3.9 | 0.019 |
| EXAMPLE 5 | 16.2 | 52.4 | 3.8 | 0.026 |
| COMPARATIVE EXAMPLE 1 | 0.8 | 76.2 | 5.1 | 0.020 |
| COMPARATIVE EXAMPLE 2 | 1.4 | 34.1 | 5.0 | 0.031 |
| COMPARATIVE EXAMPLE 3 | 2.0 | 57.2 | 5.0 | 0.021 |
| COMPARATIVE EXAMPLE 4 | 13.8 | 34.2 | 3.9 | 0.034 |
| COMPARATIVE EXAMPLE 5 | 22.7 | 46.7 | 3.2 | 0.048 |
| COMPARATIVE EXAMPLE 6 | 24.4 | 28.9 | 3.2 | 0.047 |

Fig.8

|  | R1 | R2 | R3 | AMOUNT OF ABRASION | FRICTION COEFFICIENT |
|---|---|---|---|---|---|
|  | % | % | % | μm |  |
| EXAMPLE 6 | 6.8 | 55.3 | 2.3 | 3.9 | 0.017 |
| EXAMPLE 7 | 11.3 | 53.4 | 5.8 | 3.3 | 0.018 |
| EXAMPLE 8 | 7.8 | 52.5 | 9.6 | 3.2 | 0.020 |
| EXAMPLE 9 | 10.2 | 48.1 | 12.4 | 3.2 | 0.017 |
| EXAMPLE 10 | 9.6 | 51.2 | 18.8 | 3.3 | 0.026 |

Fig.9

|  | R1 | R2 | R3 | Rx | AMOUNT OF ABRASION | FRICTION COEFFICIENT |
|---|---|---|---|---|---|---|
|  | % | % | % | % | μm |  |
| EXAMPLE 11 | 11.2 | 51.4 | 7.4 | 0.10 | 3.3 | 0.018 |
| EXAMPLE 12 | 10.4 | 50.1 | 9.6 | 0.20 | 2.6 | 0.020 |
| EXAMPLE 13 | 9.3 | 47.0 | 9.0 | 0.25 | 2.1 | 0.018 |
| EXAMPLE 14 | 7.7 | 49.2 | 6.9 | 0.30 | 1.9 | 0.019 |
| EXAMPLE 15 | 8.1 | 57.3 | 11.1 | 0.35 | 2.0 | 0.020 |
| EXAMPLE 16 | 7.2 | 47.9 | 8.6 | 0.40 | 2.1 | 0.019 |
| EXAMPLE 17 | 8.8 | 53.3 | 10.2 | 0.45 | 2.0 | 0.027 |
| EXAMPLE 18 | 10.5 | 50.8 | 7.5 | 0.50 | 1.9 | 0.028 |

Fig.10

|  | R1 | R2 | R3 | Rx | MEETING OF EXPRESSION (1) | AMOUNT OF ABRASION | FRICTION COEFFICIENT |
|---|---|---|---|---|---|---|---|
|  | % | % | % | % |  | μm |  |
| EXAMPLE 19 | 7.8 | 52.1 | 6.7 | 0.30 | × | 2.0 | 0.019 |
| EXAMPLE 20 | 8.6 | 46.8 | 9.1 | 0.28 | × | 1.9 | 0.018 |
| EXAMPLE 21 | 10.7 | 57.2 | 8.3 | 0.32 | ○ | 1.5 | 0.018 |
| EXAMPLE 22 | 8.3 | 51.3 | 8.8 | 0.34 | ○ | 1.5 | 0.018 |

US 12,215,742 B2

SLIDING MEMBER

CROSS-REFERENCE TO RELATED APPLICATION(S)

This is a National Stage entry into the United States Patent and Trademark Office from International Patent Application No. PCT/JP2020/044260, filed on Nov. 27, 2020, which claims priority to Japanese Patent Application No. 2019-218760, filed on Dec. 3, 2019, the entire contents of both of which are incorporated herein by reference.

FIELD OF THE INVENTION

The present disclosure relates to a sliding member.

BACKGROUND OF THE INVENTION

In the related art, a sliding member including a resin overlay layer on a sliding-surface side of a bearing alloy layer is known (Japanese Patent Laid-Open No. 2008-95725). A solid lubricant is added to the resin overlay layer, and the resin overlay layer contributes to reduction of friction and an improvement in conformability. Japanese Patent Laid-Open No. 2008-95725 is designed to improve properties through specification of a strength ratio of a diffractive surface based on X-ray diffraction of the solid lubricant. In other words, in the case of Japanese Patent Laid-Open No. 2008-95725, sliding performance is enhanced by setting a cleavage direction of the solid lubricant contained in the resin overlay layer.

However, internal combustion engines have been required to have yet higher outputs and higher revolution in recent years. Therefore, sliding members in the related art have a trend that abrasion resistance has become insufficient due to the increases in output and revolution. Insufficient abrasion resistance may cause a problem that the resin overlay layer is worn out in a short period of time. On the other hand, if the cleavage direction of the solid lubricant is set on a side on which the abrasion resistance is enhanced, there is a problem that it may cause an increase in a friction coefficient of the resin overlay layer.

SUMMARY OF THE INVENTION

Thus, an object of the present disclosure is to provide a sliding member that enhances strength of a resin overlay layer and improves abrasion resistance without leading to an increase in friction coefficient.

In order to solve the aforementioned problem, a sliding member according to an embodiment of the present disclosure includes: a resin overlay layer on a sliding-surface side of a bearing alloy layer. The resin overlay layer includes a resin binder and 20% by volume or more of solid lubricant particles with an anisotropic shape dispersed in the resin binder.

When a virtual straight line that is parallel to the sliding surface is defined as being located at 0°, a virtual axis that is perpendicular to the sliding surface is defined as being located at 90°, an angle formed by the straight line and a major axis of the particles is defined as $\theta$, and the total number of the particles included in a given observation region of the resin binder is defined as N, a rate $R1=N1/N$ of the number N1 of first particles with the angle $\theta$ being $70° \leq \theta \leq 90°$ from among the particles is $3\% \leq R1 \leq 20\%$, and a rate $R2=N2/N$ of the number N2 of second particles with the angle $\theta$ being $\theta \leq 20°$ from among the particles is $35\% \leq R2 \leq 65\%$.

In this manner, the rate R1 and the rate R2 are defined for the solid lubricant particles included in the resin overlay layer. The first particles are particles with the angle $\theta$ of the major axis being $70° \leq \theta \leq 90°$ from among the solid lubricant particles. Such first particles are in a state in which the particles stand in the thickness direction in the resin overlay layer. Therefore, the first particles receive a load in the thickness direction of the resin overlay layer, and durability against the load increases. In this manner, the first particles support the resin overlay layer in the thickness direction and contributes to an improvement in strength of the resin overlay layer. On the other hand, the second particles are particles with the angle $\theta$ of the major axis being $\theta \leq 20°$ from among the solid lubricant particles. Such second particles are in a state in which the particles lie down along the sliding surface in the resin overlay layer. Therefore, the second particles come into contact with a counterpart member in relatively large surfaces when the second particles are exposed to the sliding surface. In this manner, the second particles contribute to reduction of a friction coefficient of the resin overlay layer. Also, in the present embodiment, the rate R1 of the first particles and the rate R2 of the second particles are controlled within the appropriate ranges. Therefore, it is possible to enhance the strength of the resin overlay layer and to improve abrasion resistance without leading to an increase in friction coefficient.

Also, in the embodiment of the present disclosure, the rate R1 is preferably $6\% \leq R1 \leq 15\%$, and the rate R2 is preferably $40\% \leq R2 \leq 60\%$.

It is possible to enhance the strength of the resin overlay layer and to further improve abrasion resistance while further reducing the friction coefficient by defining the rate R1 and the rate R2 in this manner.

In the embodiment of the present disclosure, a rate $R3=N3/N$ of the number N3 of third particles with the angle $\theta$ being $40° \leq \theta \leq 50°$ from among the particles is preferably $5\% \leq R3 \leq 15\%$.

The third particles are particles with the angle $\theta$ of the major axis being $40° \leq \theta \leq 50°$ from among the solid lubricant particles. Such third particles have an intermediate posture between the first particles and the second particles in the resin overlay layer. Therefore, the third particles play a role like braces inside the resin overlay layer. In this manner, the third particles contribute to an improvement in strength of the resin overlay layer. Therefore, it is possible to enhance the strength of the resin overlay layer and to further improve abrasion resistance.

In the embodiment of the present disclosure, a vertical component rate Rx of the particles is preferably $0.20 \leq Rx \leq 0.50$.

The solid lubricant particles have an anisotropic shape such as a plate shape or an oval shape, for example. Not only the angle $\theta$ but also the length of horizontal components and the length of vertical components of the solid lubricant particles with such an anisotropic shape contribute to performance of the overlay layer. Here, the length L1 of the vertical components is calculated by $L1 = L \times \sin \theta$ when the entire length of the major axis of the solid lubricant particles is defined as L. Also, the length L2 of the horizontal components is calculated by $L2 = L \times \cos \theta$. Also, the vertical component rate Rx is calculated by Expression (2) below using the length L1 of the vertical components and the length L2 of the horizontal components. The vertical component rate Rx can further improve performance of the overlay layer when $0.25 \leq Rx \leq 0.40$.

$$Rx = \sum L\sin\theta / \{\sum (L\sin\theta + L\cos\theta)\} \quad \text{Expression (2)}$$
$$= \sum L1 / \sum (L1 + L2)$$

In the embodiment of the present disclosure, when a distribution parameter is defined as a, a range of 0° to 90° from the straight line to the axis is sectioned in units of 10° into angular ranges of $A-10° < x \leq A°$ (A=10, 20, 30, ... 90), which of the angular ranges the angle of the major axis of the particles is included is classified, and the number n of the particles included in each of the angular ranges is counted, a distribution rate n/N (%) of the particles included in the resin binder is represented by Expression (1) below:

$$\frac{n}{N}[\%] = 100 \times e^{-\left(\frac{x}{a}\right)} \times \frac{e^{-\left(\frac{10}{a}\right)} - 1}{e^{-\left(\frac{10}{a}\right)} \times \left(e^{-\left(\frac{90}{a}\right)} - 1\right)} \quad \text{Expression (1)}$$

When the solid lubricant particles have distribution that satisfies an expression as represented by Expression (1) for each angular range, abrasion resistance of the overlay layer is improved.

Note that in Expression (1), n/N [%] on the left side means a value converted in percentage terms. Also, the range of 0° to 90° from the virtual straight line that is parallel to the sliding surface to the axis is sectioned in units of 10° into angular ranges of $A-10° < x \leq A°$ (A=10, 20, 30, ... 90). In other words, the range from the straight line to the axis is split into each of $0° \leq x \leq 10°$, $10° < x \leq 20°$, $20° < x \leq 30°$, $30° < x \leq 40°$, $40° < x \leq 50°$, $50° < x \leq 60°$, $60° < x \leq 70°$, $70° < x \leq 80°$, and $80° < x \leq 90°$. In this case, the lower limit $\theta = 0°$ as a lower limit is included within the angular range of 0° to 10° only for A=10.

BRIEF DESCRIPTION OF THE DRAWINGS

FIG. 6 is an overview diagram illustrating test conditions in examples of the sliding member according to the embodiment and comparative examples.

FIG. 7 is an overview diagram illustrating test results in the examples of the sliding member according to the embodiment and the comparative examples.

FIG. 8 is an overview diagram illustrating test results in the examples of the sliding member according to the embodiment.

FIG. 9 is an overview diagram illustrating test results in the examples of the sliding member according to the embodiment.

FIG. 10 is an overview diagram illustrating test results in the examples of the sliding member according to the embodiment.

DESCRIPTION OF EMBODIMENT(S) OF THE INVENTION

Hereinafter, an embodiment of a sliding member will be described on the basis of the drawings.

Figure 2:
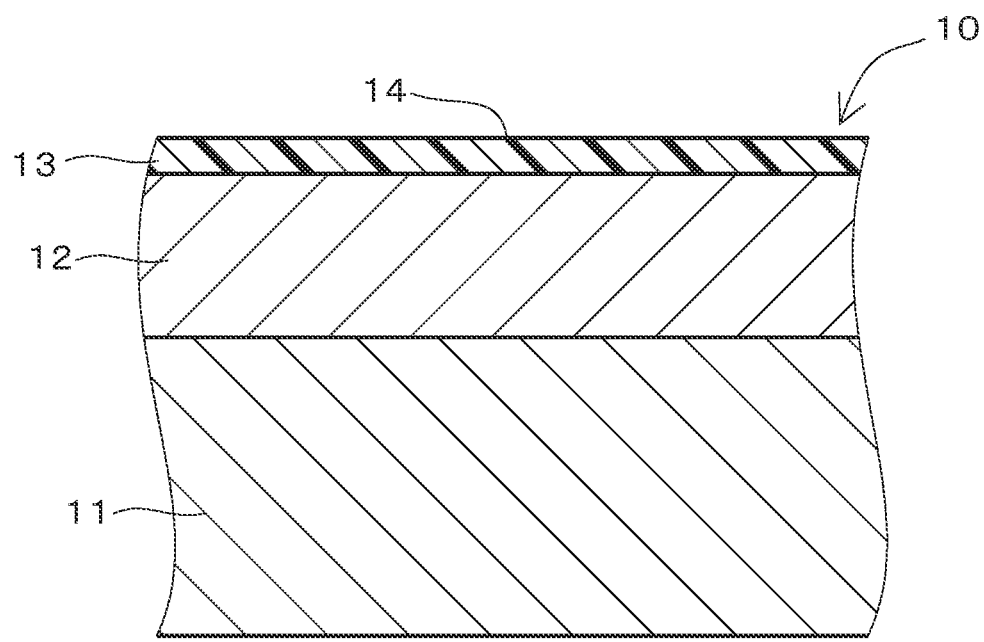
FIG. 2 is a schematic sectional view illustrating the sliding member according to the embodiment.

As illustrated in FIG. 2, a sliding member 10 includes a back metal layer 11, a bearing alloy layer 12, and a resin overlay layer 13. Note that the sliding member 10 may include an intermediate layer, which is not illustrated, between the back metal layer 11 and the bearing alloy layer 12. Also, the sliding member 10 is not limited to the example illustrated in FIG. 2 and may include a plurality of bearing alloy layers 12, intermediate layers, and layers having other functions between the back metal layer 11 and the resin overlay layer 13. The sliding member 10 forms a sliding surface 14 that slides along a counterpart member at an end portion on the side of the resin overlay layer 13. In the case of the present embodiment illustrated in FIG. 2, the bearing alloy layer 12 and the resin overlay layer 13 are laminated in order on the back metal layer 11 on the side of the sliding surface 14 in the sliding member 10. The back metal layer 11 is formed of metal such as iron or copper, for example, or an alloy. The bearing alloy layer 12 is formed of Al, Cu, or an alloy thereof, for example.

Figure 3:
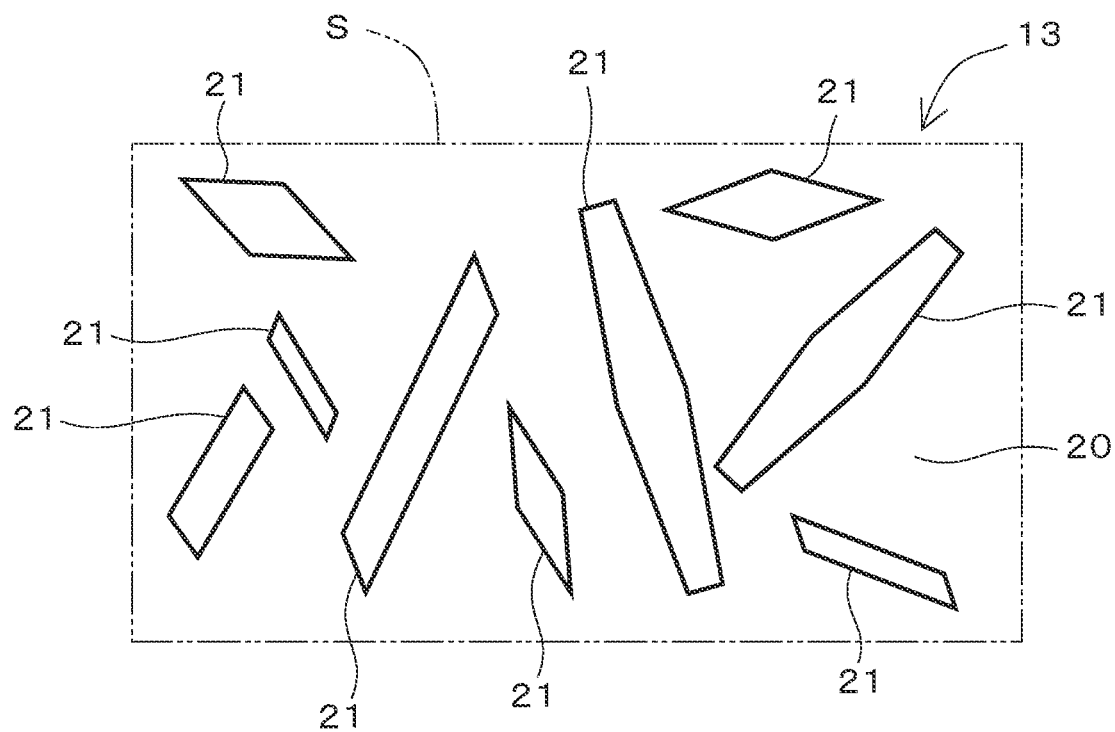
FIG. 3 is a schematic view illustrating an observation region set in the resin overlay layer in the sliding member according to the embodiment.

The resin overlay layer 13 includes a resin binder 20 and solid lubricant particles 21 as illustrated in FIG. 3. The resin binder 20 is a main component constituting the resin overlay layer 13, and for example, one or more kinds selected from polyamideimide, polyimide, polybenzimidazole, polyamide, an epoxy resin, a phenol resin, polyacetal, polyether ether ketone, polyethylene, polyphenylene sulfide, polyetherimide, a fluorine resin, and an elastomer resin are used. Also, the resin binder 20 may be a polymer alloy. In the present embodiment, polyamideimide is used as the resin binder 20. Also, one or more kinds selected from solid lubricants with cleavability or a layered structure such as molybdenum disulfide, tungsten disulfide, h-BN, graphite fluoride, graphite, mica, talc, or melamine cyanurate, for example, are used as the solid lubricant. Also, the solid lubricant particles 21 preferably have high load bearing. In the case of the present embodiment, molybdenum disulfide with high load bearing is used as the solid lubricant.

Additives such as a filler, for example, may be added to the resin overlay layer 13. In this case, one or more kinds selected from calcium fluoride, calcium carbonate, calcium phosphate, oxides such as iron oxide, aluminum oxide, chromium oxide, cerium oxide, zirconium oxide, titanium oxide, silicon oxide, and magnesium oxide, carbides such as molybdenum carbide and silicon carbide, aluminum nitride, silicon nitride, cubic boron nitride, diamond, and the like are used as the additives.

The sliding member 10 in the present embodiment includes 20% by volume or more of solid lubricant particles 21 in the resin overlay layer 13. In this case, the upper limit of the content of solid lubricant in the resin overlay layer 13 is preferably set to about 60% by volume. If the content of solid lubricant exceeds 60% by volume, there is a concern that physical strength of the resin overlay layer 13 may deteriorate due to shortage of the resin binder 20. However, the upper limit value of the content of solid lubricant can be adjusted depending on a combination of the resin binder 20 and the solid lubricant constituting the resin overlay layer 13.

Figure 1:
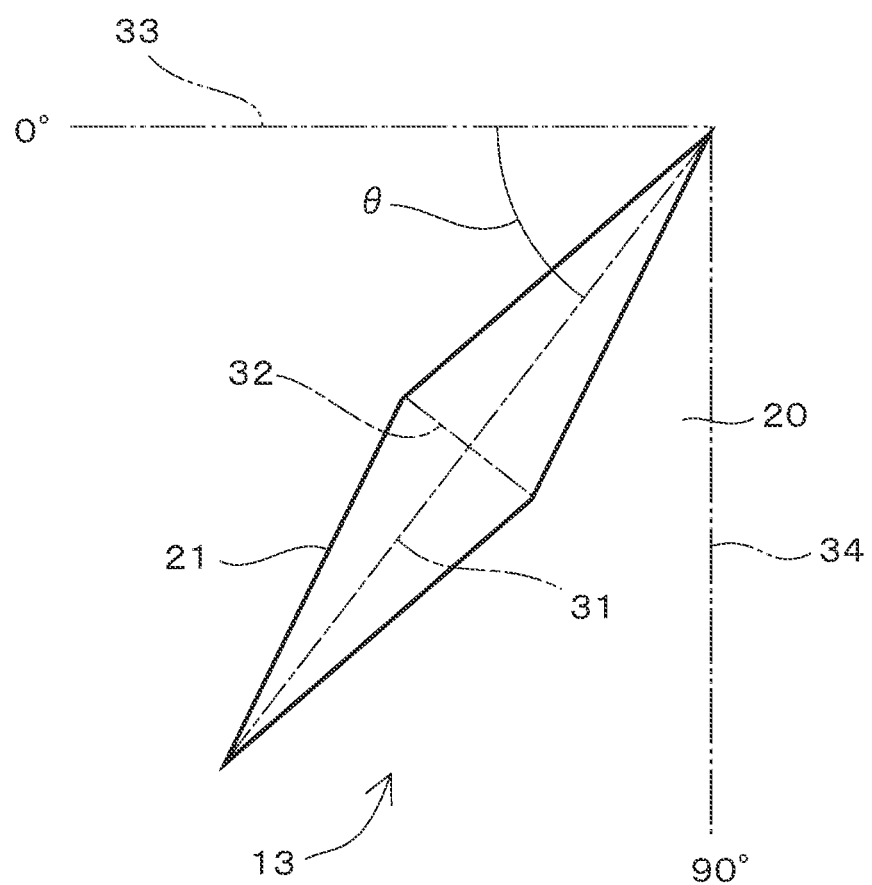
FIG. 1 is a schematic view illustrating solid lubricant particles included in a resin overlay layer of a sliding member according to an embodiment.

In the case of the present embodiment, the solid lubricant particles 21 has an anisotropic shape having a major axis 31 and a minor axis 32 as illustrated in FIG. 1. The solid lubricant particles 21 are dispersed in the resin binder 20. In the solid lubricant particles 21 included in the resin overlay layer 13, the major axis 31 is inclined at an angle θ within a range of 0° to 90° when a virtual straight line 33 that is parallel to the sliding surface 14 is defined as being located at 0°, a virtual axis 34 extending in the thickness direction perpendicularly to the sliding surface 14 is defined as being located at 90°. Specifically, the resin overlay layer 13 is cut along a given section in the thickness direction, and a given observation region S is set as illustrated in FIG. 3. Also, the total number of particles 21 included in the observation region S is defined as a total number N. In the present embodiment, particles 21 across boundaries for sectioning the observation region S are not measured. Also, the major axis 31 of each particle 21 is extracted as illustrated in FIG. 1 from the particles 21 included in the observation region S. In this case, an image of the observation region S observed with a scanning electron microscope (SEM), for example, is analyzed with analysis software. In the present embodiment, "Image-pro plus ver. 4.5" is used as the analysis software. Specifically, the solid lubricant particles 21 included in the obtained image are approximated to ovals, and the angle θ of the major axis 31 of the particles 21 is detected from the approximated oval. The approximation to an oval is performed by calculating an oval with the same area, the same first moment, and the same second moment as a target particle 21, for example. In the present embodiment, particles 21 with major axes 31 of 0.3 μm or more are regarded as observation targets from among the particles 21 included in the observation region S. Note that it is a matter of course that smaller angle is employed as the angle θ of the major axis when two angles are measured between the straight line 33 and the axis 34.

The particles 21 included in the observation region S are classified into first particles with the angle θ of the extracted major axis 31 being 70°≤θ≤90° and second particles with the angle θ being θ≤20°. Also, the number of the first particles included in the observation region S is defined as N1, and the number of the second particles is defined as N2. In this manner, the rate R1 of the number N1 of the first particles included in the observation region S is calculated as R1=N1/N, and the rate R2 of the number N2 of the second particles is calculated as R2=N2/N. In the case of the present embodiment, the rate R1 of the number N1 of the first particles is 3%≤R1≤20%. Additionally, the rate R2 of the number N2 of the second particles is 35%≤R2≤65%. In these cases, the rate R1 of the number N1 of the first particles is preferably 6%≤R1≤15%, and the rate R2 of the number N2 of the second particles is preferably 40%≤R2≤60%. Moreover, the particles 21 included in the observation region S is also classified into third particles with the angle θ being 40°≤θ≤50° in addition to the aforementioned first particles and the second particles. If the number of the third particles included in the observation region S is defined as N3, the rate R3 of the number N3 of the third particles is calculated as R3=N3/N. Also, the rate R3 of the number N3 of the third particles is preferably 5%≤R3≤15%.

Figure 4:
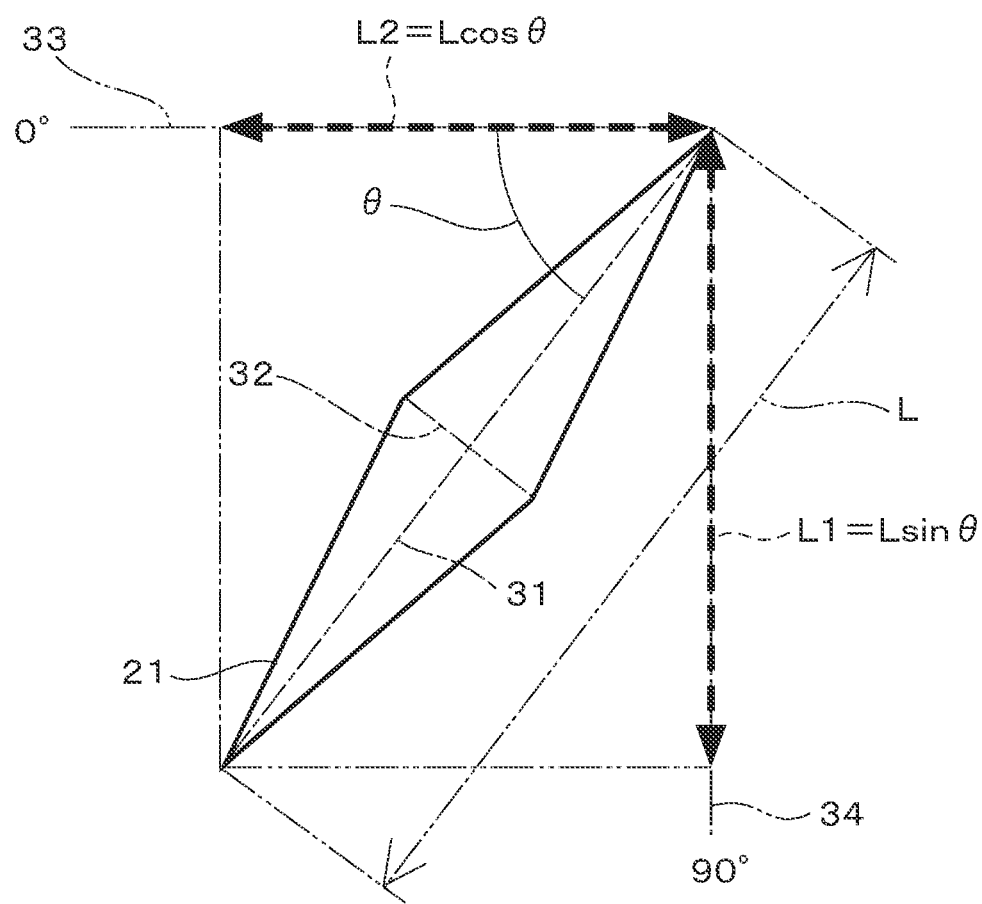
FIG. 4 is a schematic view illustrating the solid lubricant particles included in the resin overlay layer of the sliding member according to the embodiment.

The solid lubricant particles 21 included in the resin binder 20 have the angle θ as described above. At this time, if the length of the major axis 31 of the particles 21 is defined as L, the particles 21 have a length L1=L×sin θ of the vertical direction components and a length L2=L×cos θ of the horizontal direction components as illustrated in FIG. 4. A value representing a relationship between the length L1 of the vertical direction components and the length L2 of the horizontal direction components is calculated by Expression (2) below. At this time, the vertical component rate Rx is preferably 0.20≤Rx≤0.50 and is more preferably 0.25≤Rx≤0.40. The vertical component rate Rx is calculated using Expression (2) below from the solid lubricant particles 21 included in the observation region S.

$$Rx = \sum L\sin\theta / \left\{ \sum (L\sin\theta + L\cos\theta) \right\}$$
$$= \sum L1 / \sum (L1 + L2)$$

Expression (2)

As described above, when the straight line 33 that is parallel to the sliding surface 14 is defined as being located at 0°, and the virtual axis 34 that is perpendicular to this is defined as being located at 90°, the range of 0° to 90° from the straight line 33 to the axis 34 is sectioned in units of 10° into A−10°<x≤A° (A=10, 20, 30, . . . , 90). In other words, the range from the straight line 33 to the axis 34 is split into each of 0°≤x≤10°, 10°<x≤20°, 20°<x≤30°, 30° <x≤40°, 40°<x≤50°, 50°<x≤60°, 60°<x≤70°, 70°<x≤80°, and 80°<x≤90°. In this case, the lower limit θ=0° as a lower limit is included within the angular range of 0° to 10° only for A=10. The angle θ of the major axis 31 of the particles 21 included in the observation region S is classified depending on which of the angular ranges of 10° it belongs to. Then, the number of particles 21 with the major axis 31 within the angular range is counted for each of the angular ranges sectioned in units of 10°, and the number is defined as n. At this time, a distribution rate n/N (%) of the particles 21 included in the observation region S preferably indicates distribution represented by Expression (1) below. In Expression (1), e is a natural logarithm, and a is a distribution parameter. The distribution parameter a is preferably 10≤a≤160, for example. Note that n/N [%] on the left side in Expression (1) means a value converted in percentage terms.

$$\frac{n}{N}[\%] = 100 \times e^{-\left(\frac{x}{a}\right)} \times \frac{e^{-\left(\frac{10}{a}\right)} - 1}{e^{-\left(\frac{10}{a}\right)} \times \left(e^{-\left(\frac{90}{a}\right)} - 1\right)}$$

Expression (1)

Next, a method for manufacturing the sliding member 10 according to the present embodiment will be described.

Figure 5:
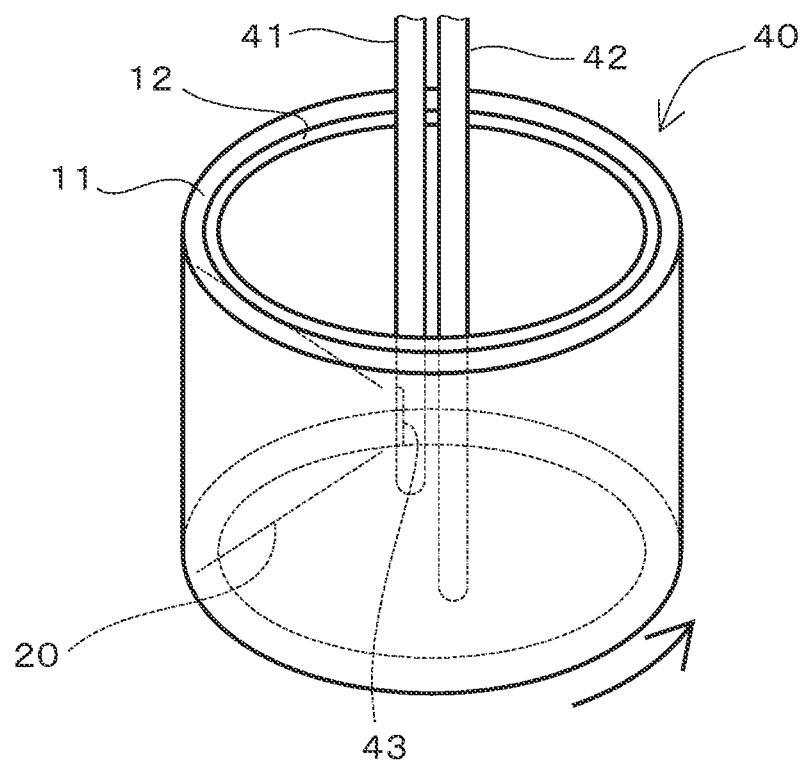
FIG. 5 is a schematic view for explaining a method for manufacturing the sliding member according to the embodiment.

As illustrated in FIG. 5, a bimetal 40 with the bearing alloy layer 12 formed on the side of one surface of the back metal layer 11 is molded into a cylindrical shape. In this case, the back metal layer 11 may be formed into a cylindrical shape, and the bearing alloy layer 12 may be formed on the inner circumferential side for the bimetal 40. Also, the bimetal is not limited to the cylindrical shape and may have a semi-cylindrical shape or a shape obtained by splitting a cylinder into a plurality of parts in the circumferential direction. In the bimetal 40, a spray portion 41 and a heat source 42 are disposed at positions facing the bearing alloy layer 12 that is on the inner circumferential side. The spray portion 41 includes a nozzle 43. The nozzle 43 is adapted to jet the resin binder 20 including the solid lubricant particles 21 for forming the resin overlay layer 13. Also, the heat source 42 heats the inner circumferential side of the bimetal 40 to dry the jetted resin binder 20.

In the case of the present embodiment, the bimetal 40 formed into a cylindrical shape is rotated in the circumferential direction as illustrated by the arrow in FIG. 5. In this manner, the nozzle 43 of the spray portion 41 jets the resin binder 20 including the solid lubricant particles 21 on the inner circumferential side of the rotating bimetal 40. The resin binder 20 adhering to the inner circumferential side of the bimetal 40 is heated by the heat source 42 and is dried.

In a case in which the resin binder 20 including the solid lubricant particles 21 is simply jetted from the nozzle 43 of the spray portion 41 to the inner circumferential side of the bimetal 40, the solid lubricant particles 21 included in the resin binder 20 are in irregular postures. In other words, the postures of the solid lubricant particles 21 are not controlled, and the solid lubricant particles 21 are included in the resin binder 20 in irregular postures with random distribution of the angle θ. On the other hand, in the present embodiment, the resin binder 20 is sprayed and dried with the bimetal 40 rotated at a high speed when the resin overlay layer 13 is formed. In this manner, the resin binder 20 is solidified on the side close to the surface, that is, the nozzle 43 prior to the inside of the sprayed layer. Therefore, the surface of the resin binder 20 adhering to the bimetal 40 is solidified, and the inside thereof is brought into a half-dried state. Therefore, the solid lubricant particles 21 included in the resin binder 20 is captured by the resin binder 20 solidified on the side closer to the surface of the major axis 31 prior to the other portions, and changes in posture are limited. On the other hand, the solid lubricant particles 21 can change postures inside the half-dried resin binder 20 until the inside of the resin binder 20 is solidified. Therefore, the angle θ of the solid lubricant particles 21 with respect to the sliding surface 14 changes inside the half-dried resin binder 20 due to a centrifugal force applied due to rotation of the bimetal 40. Also, the postures of the solid lubricant particles 21 are fixed by the resin binder 20 being completely dried to the inside.

In this manner, the angle θ of the solid lubricant particles 21 included in the resin binder 20 is controlled by adjusting the rotation frequency of the bimetal 40, the temperature of the heat source 42, and the distance from the heat source 42 to the formed resin binder 20, for example, in the present embodiment. Note that the rotation frequency of the bimetal 40 may be constant from an initial stage to a final stage for forming the resin overlay layer 13, or acceleration and deceleration may be performed in the process of the formation.

As described above, if the resin binder 20 including the solid lubricant particles 21 is jetted onto the bimetal 40, and the solidified resin binder 20 is formed up to a desired thickness, then the sliding member 10 including the resin overlay layer 13 is formed.

Hereinafter, examples of the sliding member 10 according to the present embodiment will be described by comparing the examples with comparative examples.

For samples of the sliding members 10 manufactured in the aforementioned procedure in the examples and the comparative examples, abrasion resistance was evaluated from the amounts of abrasion using conditions illustrated in FIG. 6, and friction coefficients were measured. In regard to the test conditions illustrated in FIG. 6, the rotation frequency was not constant at 500 rpm, and a "start-stop" test in which 0 rpm and 500 rpm were repeated every 5 seconds was conducted.

As illustrated in FIG. 7, in all Examples 1 to 5 in which both the rate R1 and the rate R2 were satisfied, the strength of the resin overlay layer 13 was improved, and abrasion resistance was improved without leading to an increase in friction coefficient. On the other hand, in Comparative Example 1, both the rate R1 and the rate R2 were not satisfied, and the amount of abrasion increased as compared with Examples 1 to 5. Similarly, in Comparative Examples 2 and 3 in which the rate R1 was not satisfied, the amounts of abrasion increased as compared with Examples 1 to 5. Thus, it is possible to consider that if the rate R1 of the first particles with the angle θ of 70° to 90° from among the particles 21 increases, a load in the thickness direction is received by the first particles, and durability against the load increases. In this manner, the resin overlay layer 13 in which the first particles that perform support in the thickness direction have increased has improved strength and improved abrasion resistance. On the other hand, in Comparative Examples 5 and 6 in which the rate R1 was excessively high, the friction coefficients deteriorated while the abrasion resistance was improved. This is considered to be because if the rate R1 of the first particles in the standing state becomes excessively high from among the solid lubricant particles 21 included in the resin overlay layer 13, the exposure area of the solid lubricant particles 21 exposed to the sliding surface 14 decreases. Similarly, it is possible to ascertain that in Comparative Examples 4 and 6 in which the rate R2 of the second particles from among the particles 21 decreased, the friction coefficients deteriorated. The second particles are brought into a state in which they lie down along the sliding surface 14 in the resin overlay layer 13. Therefore, when the second particles are exposed to the sliding surface 14, the second particles come into contact with a counterpart member in a relatively large surface. Therefore, the second particles contribute to reduction of the friction coefficient of the resin overlay layer 13.

As described above, it is possible to improve abrasion resistance of the resin overlay layer 13 without leading to an increase in friction coefficient by controlling the rate R1 of the first particles and the rate R2 of the second particles within the appropriate ranges as illustrated in FIG. 7.

FIG. 8 reviews the rate R3 of the third particles from among the solid lubricant particles 21 included in the resin overlay layer 13. In Examples 7 to 9 in which the rates R3 of the third particles were 5%≤R3≤15%, the amounts of abrasion significantly decreased as compared with Example 6 in which the rate R3 did not belong to the range while the rate R1 and the rate R2 were satisfied. This means the third particles are in the intermediate posture between the first particles and the second particles in the resin overlay layer 13. Therefore, the third particles play a role like braces inside the resin overlay layer 13. Thus, the third particles are considered to contribute to an improvement in strength of the resin overlay layer 13. On the other hand, in Example 10 in which the rate R3 of the third particles exceeded the upper limit while the rate R1 and the rate R2 were satisfied, the friction coefficient slightly deteriorated while the amount of abrasion decreased. It is possible to ascertain from this fact as well that it is preferable to control the rate R3 of the third particles within the appropriate range.

FIG. 9 reviews the vertical component rate Rx of the solid lubricant particles 21 included in the resin overlay layer 13. It is possible to ascertain that in Examples 12 to 18 in which the vertical component rates Rx were 0.20≤Rx≤0.50, the abrasion resistance was improved, and the friction coefficients were maintained or decreased. It is possible to ascertain that in Examples 13 to 16 in which the vertical component rates Rx were 0.25≤Rx≤0.40, in particular, both the abrasion resistance and the friction coefficients were satisfactorily balanced. It is thus possible to ascertain that the vertical component rate Rx contributes to the satisfactory balance between an improvement in abrasion resistance and a decrease in friction coefficient.

FIG. 10 reviews distribution of the solid lubricant particles 21. As illustrated in FIG. 10, Examples 21 and 22 in which distribution of the solid lubricant particles 21 satisfied Expression (1), the amounts of abrasion were further significantly reduced with the friction coefficients maintained. It is possible to ascertain from this that abrasion resistance is improved with the friction coefficient maintained when the distribution of the solid lubricant particles 21 satisfies Expression (1).

The present invention described above is not limited to the aforementioned embodiment and can be applied to various embodiments without departing from the gist thereof.

The invention claimed is:

1. A sliding member comprising:
a resin overlay layer on a sliding-surface side of a bearing alloy layer,
wherein the resin overlay layer includes
a resin binder, and
20% by volume or more of solid lubricant particles with an anisotropic shape dispersed in the resin binder,
when a virtual straight line that is parallel to the sliding surface is defined as being located at 0°, a virtual axis that is perpendicular to the sliding surface is defined as being located at 90°, an angle formed by the straight line and the major axis of the particles is defined as θ, and the total number of the particles included in a given observation region of the resin binder is defined as N,
a rate R1=N1/N of the number N1 of first particles with the angle θ being 70°≤θ≤90° from among the particles is 3%≤R1≤20%, and
a rate R2=N2/N of the number N2 of second particles with the angle θ being θ≤20° from among the particles is 35%≤R2≤65%.

2. The sliding member according to claim 1,
wherein the rate R1 is 6%≤R1≤15%, and
the rate R2 is 40%≤R2≤60%.

3. The sliding member according to claim 1, wherein a rate R3=N3/N of the number N3 of third particles with the angle θ being 40°≤θ≤50° from among the particles is 5%≤R3≤15%.

4. The sliding member according to claim 1, wherein a vertical component rate Rx of the particles is 0.20≤Rx≤0.50.

5. The sliding member according to claim 4, wherein the vertical component rate Rx is 0.25≤Rx≤0.40.

6. The sliding member according to claim 1,
wherein when a distribution parameter a is 10≤a≤160,
a range of 0° to 90° from the straight line to the axis is sectioned in units of 10° into angular ranges of A−10°<x≤A° (A=10, 20, 30, . . . 90), which of the angular ranges the angle of the major axis of the particles is included is classified, and the number n of the particles included in each of the angular ranges is counted,
a distribution rate n/N (%) of the particles included in the resin binder is represented:

$$\frac{n}{N}[\%] = 100 \times e^{-\left(\frac{x}{a}\right)} \times \frac{e^{-\left(\frac{10}{a}\right)} - 1}{e^{-\left(\frac{10}{a}\right)} \times \left(e^{-\left(\frac{90}{a}\right)} - 1\right)}$$

* * * * *